(12) United States Patent
Kim et al.

(10) Patent No.: US 11,646,759 B2
(45) Date of Patent: May 9, 2023

(54) ELECTRONIC DEVICE INCLUDING DETECTION CIRCUIT FOR CONDUCTIVE MEMBER

(71) Applicant: Samsung Electronics Co., Ltd., Gyeonggi-do (KR)

(72) Inventors: Bongsik Kim, Gyeonggi-do (KR); Inho Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 95 days.

(21) Appl. No.: 17/312,770

(22) PCT Filed: Dec. 27, 2019

(86) PCT No.: PCT/KR2019/018562
§ 371 (c)(1),
(2) Date: Jun. 10, 2021

(87) PCT Pub. No.: WO2020/138998
PCT Pub. Date: Jul. 2, 2020

(65) Prior Publication Data
US 2022/0052723 A1 Feb. 17, 2022

(30) Foreign Application Priority Data
Dec. 28, 2018 (KR) .................... 10-2018-0172327

(51) Int. Cl.
*H04B 1/40* (2015.01)
*H01Q 21/06* (2006.01)

(52) U.S. Cl.
CPC ............... *H04B 1/40* (2013.01); *H01Q 21/06* (2013.01)

(58) Field of Classification Search
None
See application file for complete search history.

(56) References Cited

U.S. PATENT DOCUMENTS 9,479,133 B2   10/2016  Kim et al.
9,819,397 B2 *  11/2017  McCormack ........ H04B 5/0031
(Continued)

FOREIGN PATENT DOCUMENTS

JP    2009-145083    7/2009
KR    1993-0005121   6/1992
(Continued)

OTHER PUBLICATIONS

PCT/ISA/210 Search Report issued on PCT/KR2019/018562, dated Apr. 23, 2020, pp. 5.
(Continued)

*Primary Examiner* — Pablo N Tran
(74) *Attorney, Agent, or Firm* — The Farrell Law Firm, P.C.

(57) ABSTRACT

According to an embodiment, an electronic device may include a first Printed Circuit Board (PCB). The first PCB may include a wireless communication circuit, a first connector which includes a first terminal and a second terminal, a first conductive path which couples the wireless communication circuit and the first terminal, a second conductive path which couples a first ground and the second terminal, a third conductive path which couples a Direct Current (DC) power source and the first conductive path, and at least one resistor and at least one first inductor coupled with the third conductive path. The electronic device may further include a second PCB electrically coupled with to at least one antenna. The second PCB may include a second connector which includes a third terminal and a fourth terminal, a fourth conductive path which couples the at least one antenna and the third terminal, a fifth conductive path which couples a second ground and the fourth terminal, at least one capacitor coupled with the fifth conductive path, a sixth conductive path which couples the second ground and the (Continued)

fourth conductive path, and at least one second inductor coupled with the sixth conductive path. The electronic device may further include a conductive member which includes a third connector capable of electrically coupling with the first connector and a fourth connector capable of electrically coupling with the second connector, and transfers a frequency signal between the wireless communication circuit and the at least one antenna, a processor electrically coupled with to the first PCB, and a memory operatively coupled with the processor. The memory may store instructions, when executed, causing the processor to couple with the third conductive path and detect, on the basis of a DC voltage input to the processor, a connecting issue between the first connector and the third connector or a connecting issue between the second connector and the fourth connector. Various other embodiments may be included.

15 Claims, 11 Drawing Sheets

(56) References Cited

U.S. PATENT DOCUMENTS

| | | | |
|---|---|---|---|
| 10,355,415 B2 * | 7/2019 | Kim | H05K 1/0215 |
| 11,061,487 B2 * | 7/2021 | Kwak | H04W 4/40 |
| 11,379,009 B2 * | 7/2022 | Hyun | H05K 5/04 |
| 2016/0169956 A1 * | 6/2016 | Kim | G01R 31/68 |
| | | | 307/125 |
| 2017/0161226 A1 * | 6/2017 | Gerber | G06F 13/385 |
| 2017/0177069 A1 * | 6/2017 | Bedare | G06F 1/263 |
| 2017/0280261 A1 * | 9/2017 | Kobayashi | H04M 1/00 |
| 2018/0113832 A1 | 4/2018 | Baek et al. | |
| 2018/0316094 A1 * | 11/2018 | Hong | H01Q 15/14 |

FOREIGN PATENT DOCUMENTS

| | | |
|---|---|---|
| KR | 2000-0018641 | 10/2000 |
| KR | 20-0378644 | 3/2005 |
| KR | 10-2016-0073127 | 6/2016 |
| KR | 10-2018-0044602 | 5/2018 |
| KR | 10-2018-0121067 | 11/2018 |

OTHER PUBLICATIONS

PCT/ISA/237 Written Opinion issued on PCT/KR2019/018562, dated Apr. 23, 2020, pp. 4.
Korean Office Action dated Jan. 10, 2023 issued in counterpart application No. 10-2018-0172327, 16 pages.

* cited by examiner

ELECTRONIC DEVICE INCLUDING DETECTION CIRCUIT FOR CONDUCTIVE MEMBER

PRIORITY

This application is a National Phase Entry of International Application No. PCT/KR2019/018562, which was filed on Dec. 27, 2019, and claims priority to Korean Patent Application No. 10-2018-0172327, filed in the Korean Intellectual Property Office on Dec. 28, 2018, the entire content of each of which is incorporated herein by reference.

TECHNICAL FIELD

An embodiment of the disclosure relates to an electronic device including a detection circuit for a conductive member which exchanges a frequency signal.

BACKGROUND ART

With the development of digital technologies, electronic devices are provided in various forms, such as a smart phone, a tablet Personal Computer (PC), a Personal Digital Assistant (PDA), or the like. The electronic device is also developed such that it is portable or worn by a user to improve portability and user accessibility. With the development of wireless communication technologies, electronic devices (e.g., communication electronic devices) are widely used in everyday life, and thus the use of content increases exponentially. The electronic device may include a plurality of Printed Circuit Boards (PCBs) which exchange a frequency signal for wireless communication and a conductive member which electrically couples the plurality of PCBs.

DISCLOSURE OF INVENTION

Technical Problem

A conductive member has a shape, for example, extending from one end including a first connector electrically coupled with one PCB to the other end including a second connector electrically coupled with another PCB, and may include, for example, a coaxial cable. When there is a connecting issue between a connector (e.g., the first connector or the second connector) disposed to the conductive member and a connector disposed to the PCB, it may be difficult for an electronic device to perform wireless communication smoothly. The connecting issue may refer to a state, for example, in which a terminal of a connector disposed to the conductive member is not coupled with a specified terminal of the connector disposed to the PCB. The connecting issue may refer to a state, for example, in which the terminal disposed to the conductive member is coupled with another terminal, other than the specified terminal of the connector disposed to the PCB.

Various embodiments of the disclosure may provide an electronic device including a detection circuit capable of detecting various connecting issues between the connector disposed to the conductive member (e.g., a coaxial cable) and the connector disposed to the PCB.

Solution to Problem

According to an embodiment, an electronic device may include a first Printed Circuit Board (PCB). The first PCB may include a wireless communication circuit, a first connector which includes a first terminal and a second terminal, a first conductive path which couples the wireless communication circuit and the first terminal, a second conductive path which couples a first ground and the second terminal, a third conductive path which couples a Direct Current (DC) power source and the first conductive path, and at least one resistor and at least one first inductor coupled with the third conductive path. The electronic device may further include a second PCB electrically coupled with to at least one antenna. The second PCB may include a second connector which includes a third terminal and a fourth terminal, a fourth conductive path which couples the at least one antenna and the third terminal, a fifth conductive path which couples a second ground and the fourth terminal, at least one capacitor coupled with the fifth conductive path, a sixth conductive path which couples the second ground and the fourth conductive path, and at least one second inductor coupled with the sixth conductive path. The electronic device may further include a conductive member which includes a third connector capable of electrically coupling with the first connector and a fourth connector capable of electrically coupling with the second connector, and transfers a frequency signal between the wireless communication circuit and the at least one antenna, a processor electrically coupled with to the first PCB, and a memory operatively coupled with the processor. The memory may store instructions, when executed, causing the processor to couple with the third conductive path and detect, on the basis of a DC voltage input to the processor, a connecting issue between the first connector and the third connector or a connecting issue between the second connector and the fourth connector.

According to an embodiment, an electronic device may include a PCB. The PCB may include a wireless communication circuit, a first connector which includes a first terminal and a second terminal, a first conductive path which couples the wireless communication circuit and the first terminal, a second conductive path which couples a ground and the second terminal, a third conductive path which couples a DC power source and the first conductive path, and at least one resistor and at least one first inductor coupled with the third conductive path, a second connector which includes a third terminal and a fourth terminal, a fourth conductive path which couples the at least one antenna and the third terminal, a fifth conductive path which couples the ground and the fourth terminal, at least one capacitor coupled with the fifth conductive path, a sixth conductive path which couples the ground and the fourth conductive path, and at least one second inductor coupled with the sixth conductive path. The electronic device may further include a conductive member which includes a third connector capable of electrically coupling with the first connector and a fourth connector capable of electrically coupling with the second connector, and transfers a frequency signal between the wireless communication circuit and the at least one antenna, a processor electrically coupled with the PCB, and a memory operatively coupled with the processor. The memory may store instructions, when executed, causing the processor to couple with the third conductive path and detect, on the basis of a DC voltage input to the processor, a connecting issue between the first connector and the third connector or a connecting issue between the second connector and the fourth connector.

Advantageous Effects of Invention

According to an embodiment of the disclosure, since various connecting issues between a connector disposed to a conductive member (e.g., a coaxial cable) and a connector disposed to a printed circuit board (PCB) can be detected, maintenance of an electronic device can be achieved easily for wireless communication performance.

In addition, effects obtained or predicted by various embodiments of the disclosure will be directly or implicitly disclosed in the detailed description of embodiments of the disclosure. For example, various effects predicted according to various embodiments of the disclosure will be disclosed in the detailed description as follows.

BEST MODE FOR CARRYING OUT THE INVENTION

Figure 1:
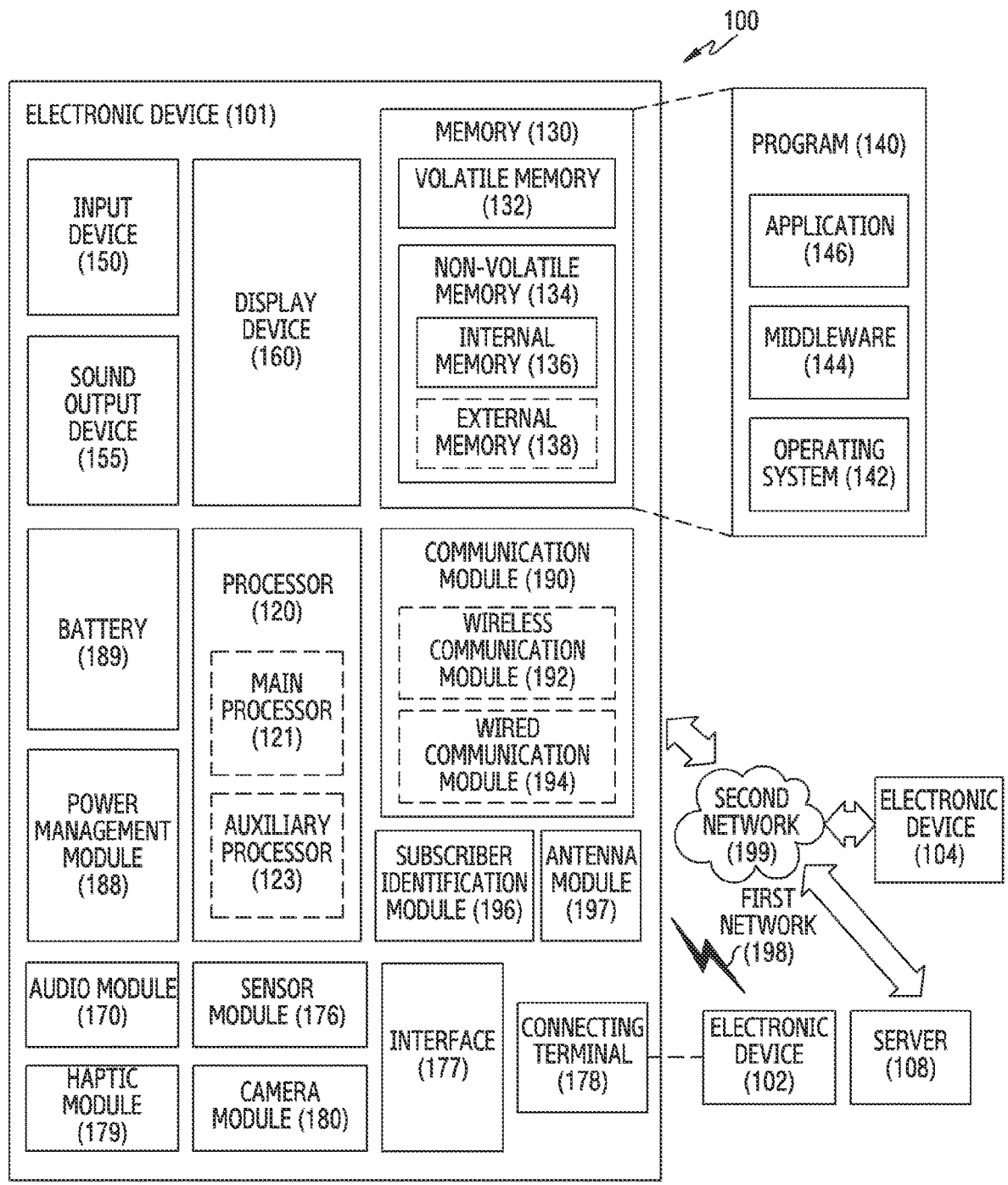
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., by wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of machine-readable storage medium (e.g., compact disc read only memory (CD-ROM)), or be distributed (e.g., downloaded or uploaded) online via an application store (e.g., PlayStore™), or between two user devices (e.g., smart phones) directly, distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
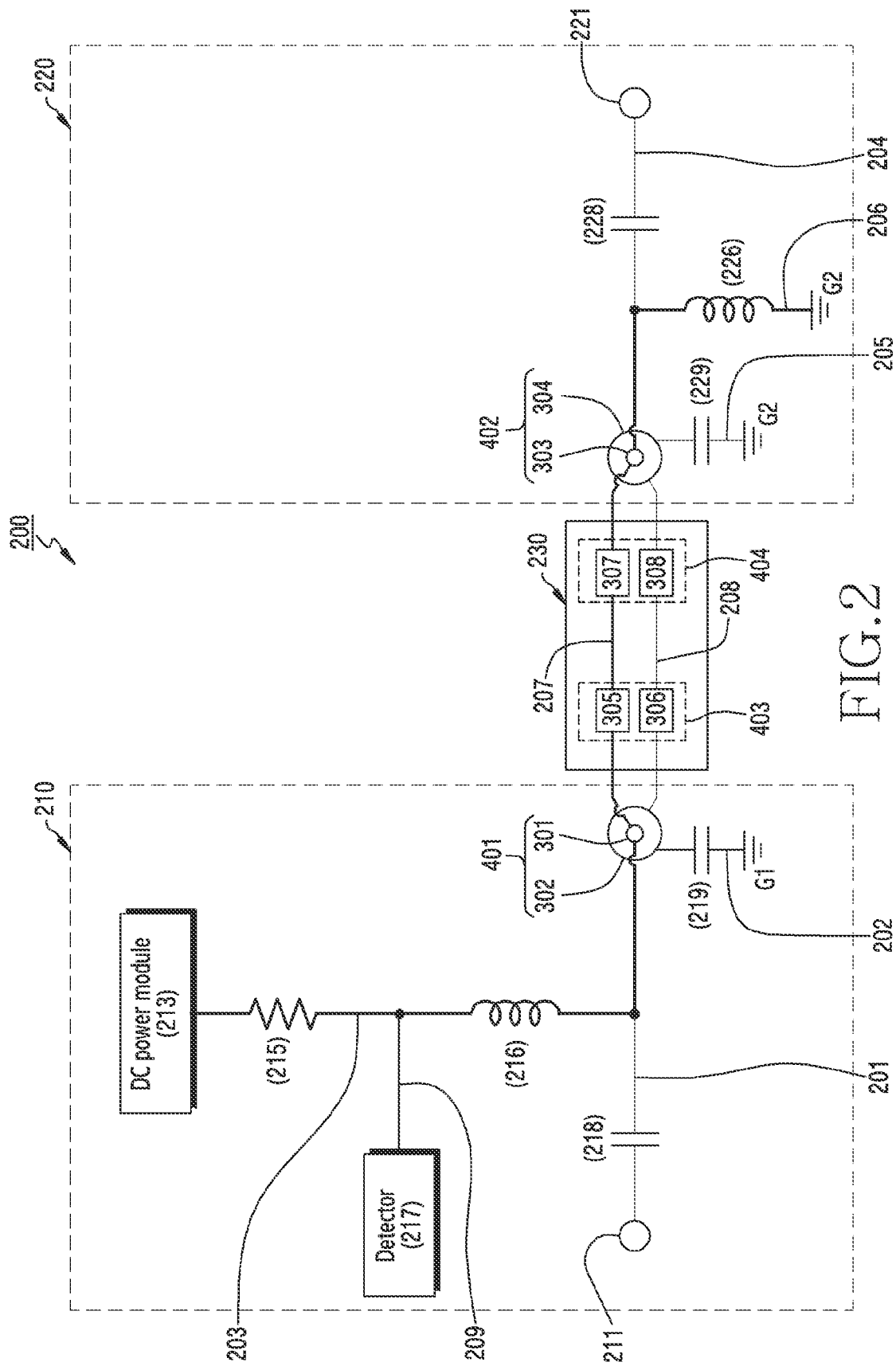
FIG. 2 illustrates a circuit for an electronic device including a plurality of Printed Circuit Boards (PCBs) which exchange a frequency signal and a conductive member which electrically couples between the plurality of PCBs according to an embodiment.
Figure 3:
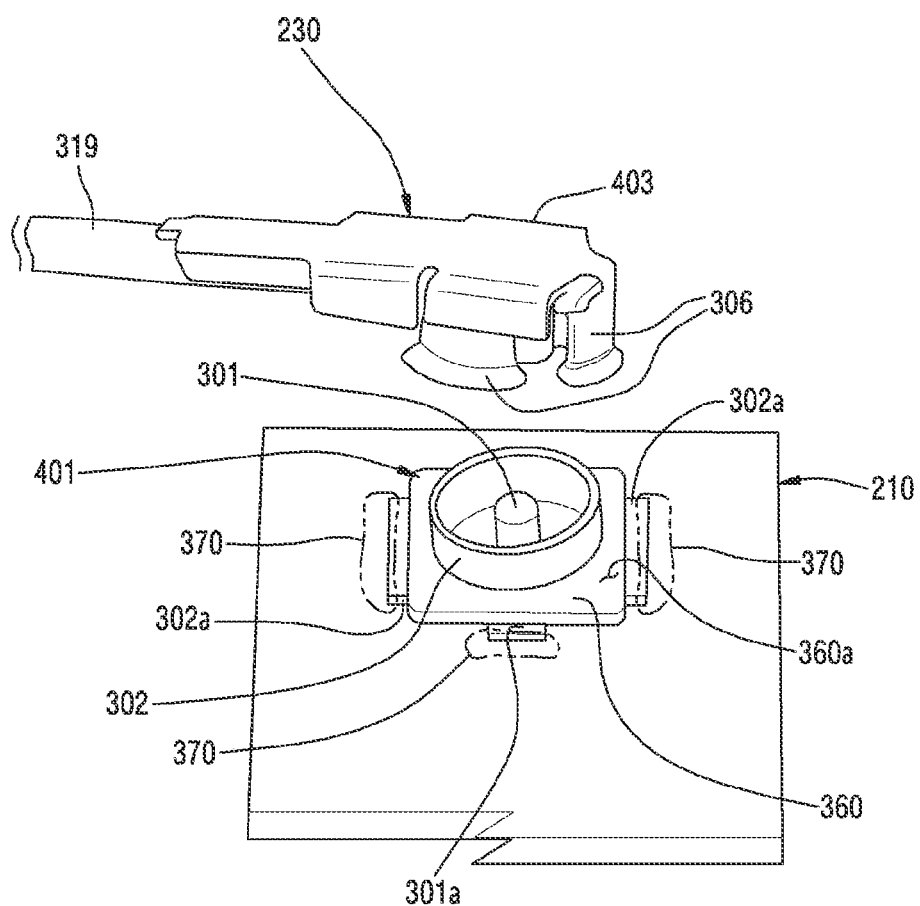
FIG. 3 illustrates a conductive member, a first PCB, and a first connector according to an embodiment.
Figure 4:
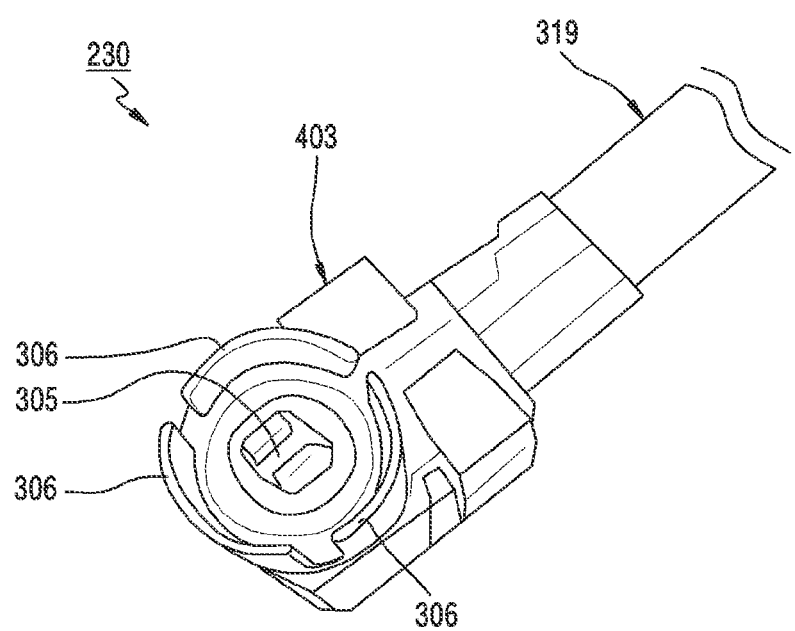
FIG. 4 illustrates a conductive member according to an embodiment.
Figure 5A:
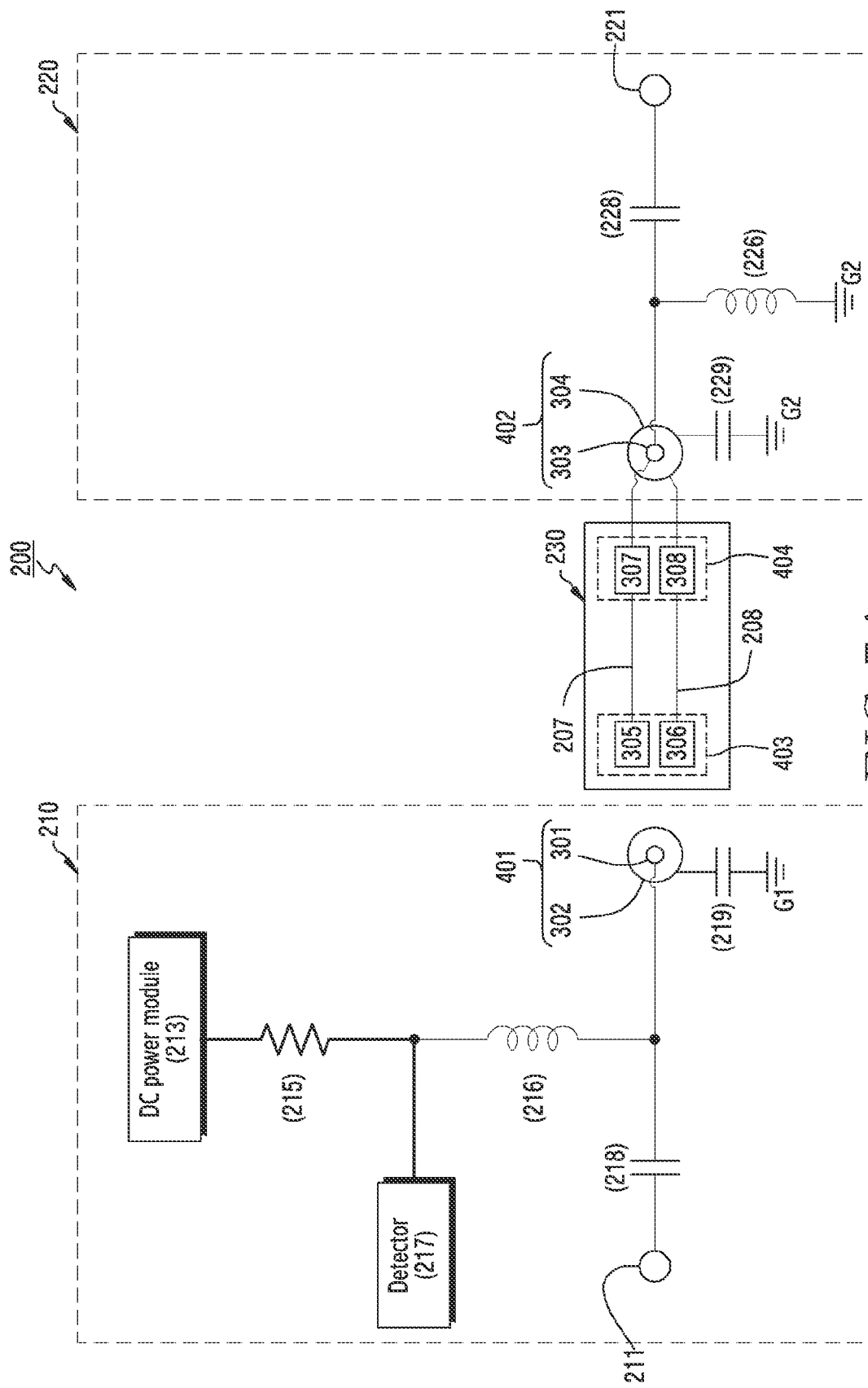
FIG. 5A illustrates a circuit for a connecting issue between a connector disposed to a conductive member and a connector disposed to a PCB according to an embodiment.
Figure 5B:
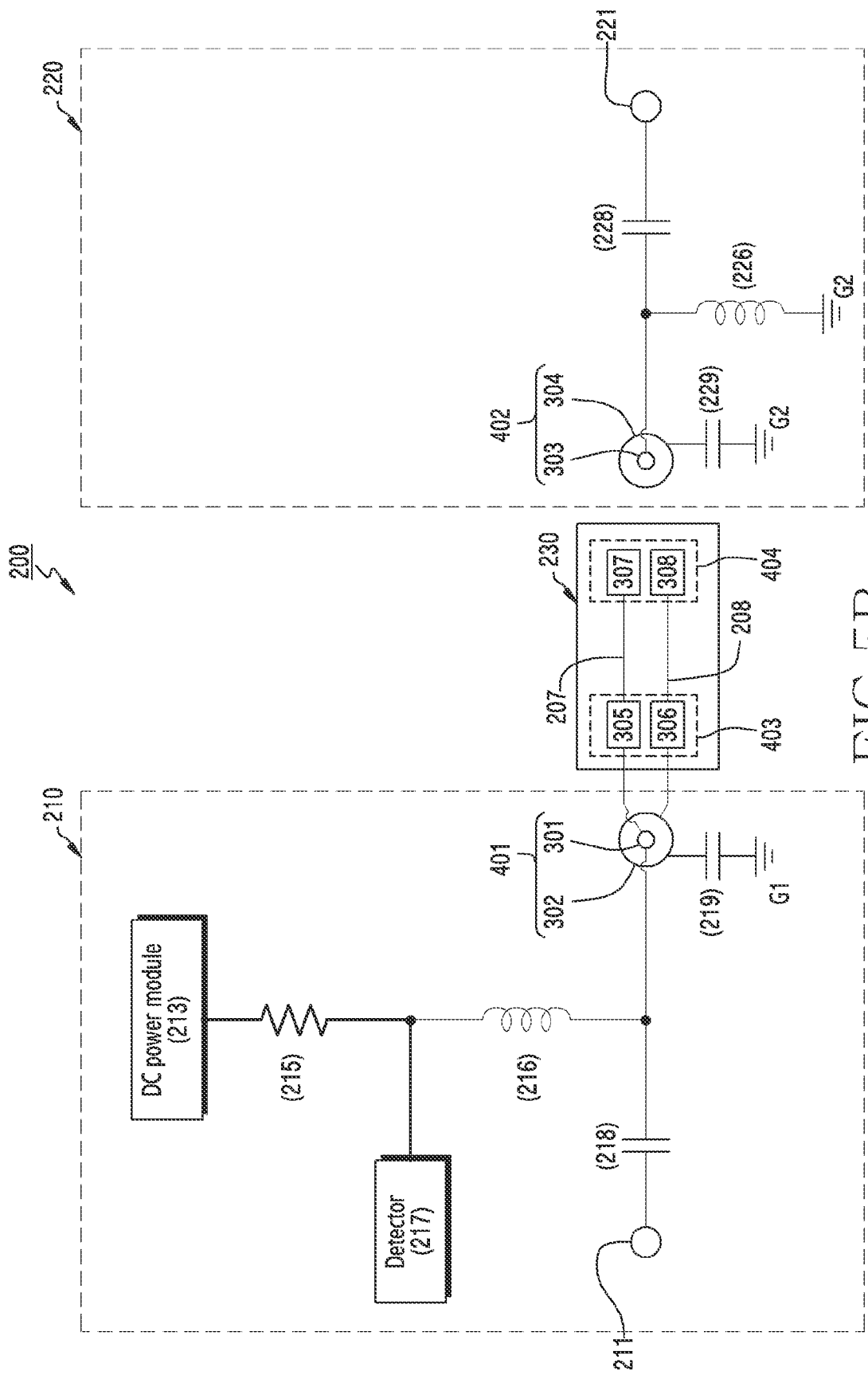
FIG. 5B illustrates a circuit for a connecting issue between a connector disposed to a conductive member and a connector disposed to a PCB according to an embodiment.
Figure 6:
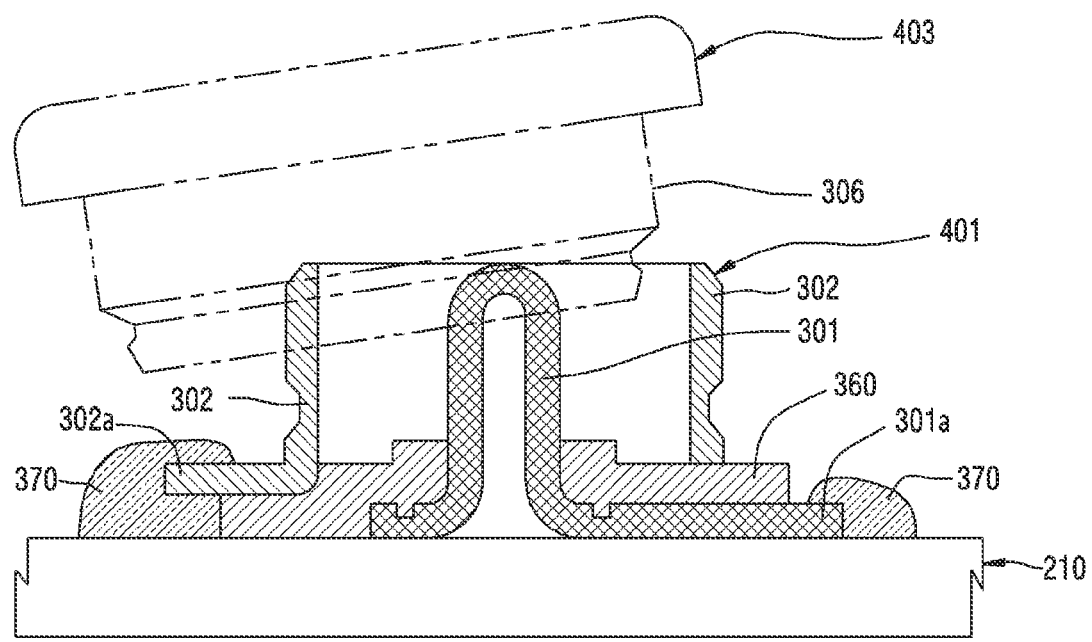
FIG. 6 illustrates a connecting issue between a connector disposed to a conductive member and a connector disposed to a PCB according to an embodiment.
Figure 7:
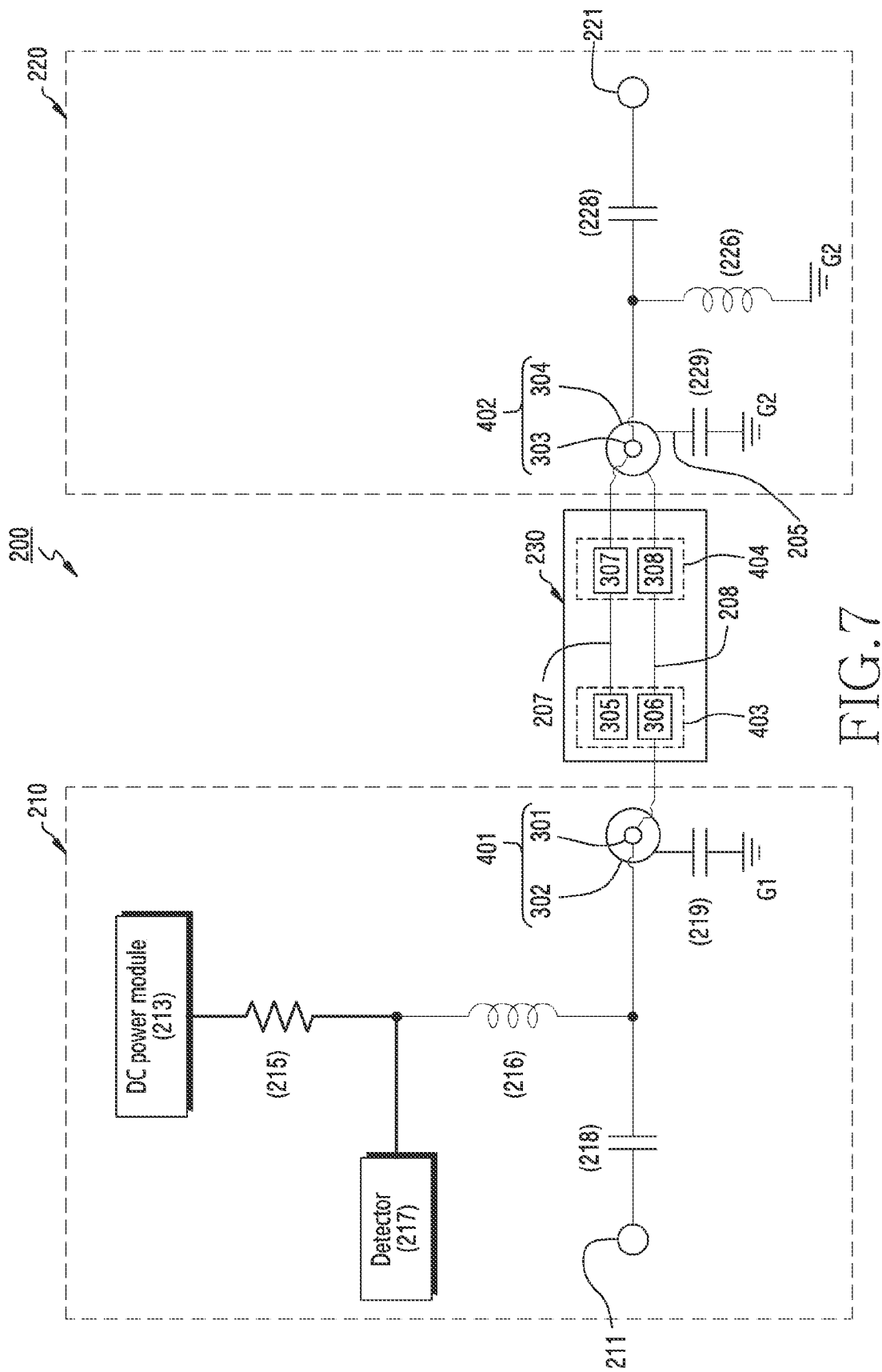
FIG. 7 illustrates a circuit for a connecting issue of FIG. 6 according to an embodiment.
Figure 8:
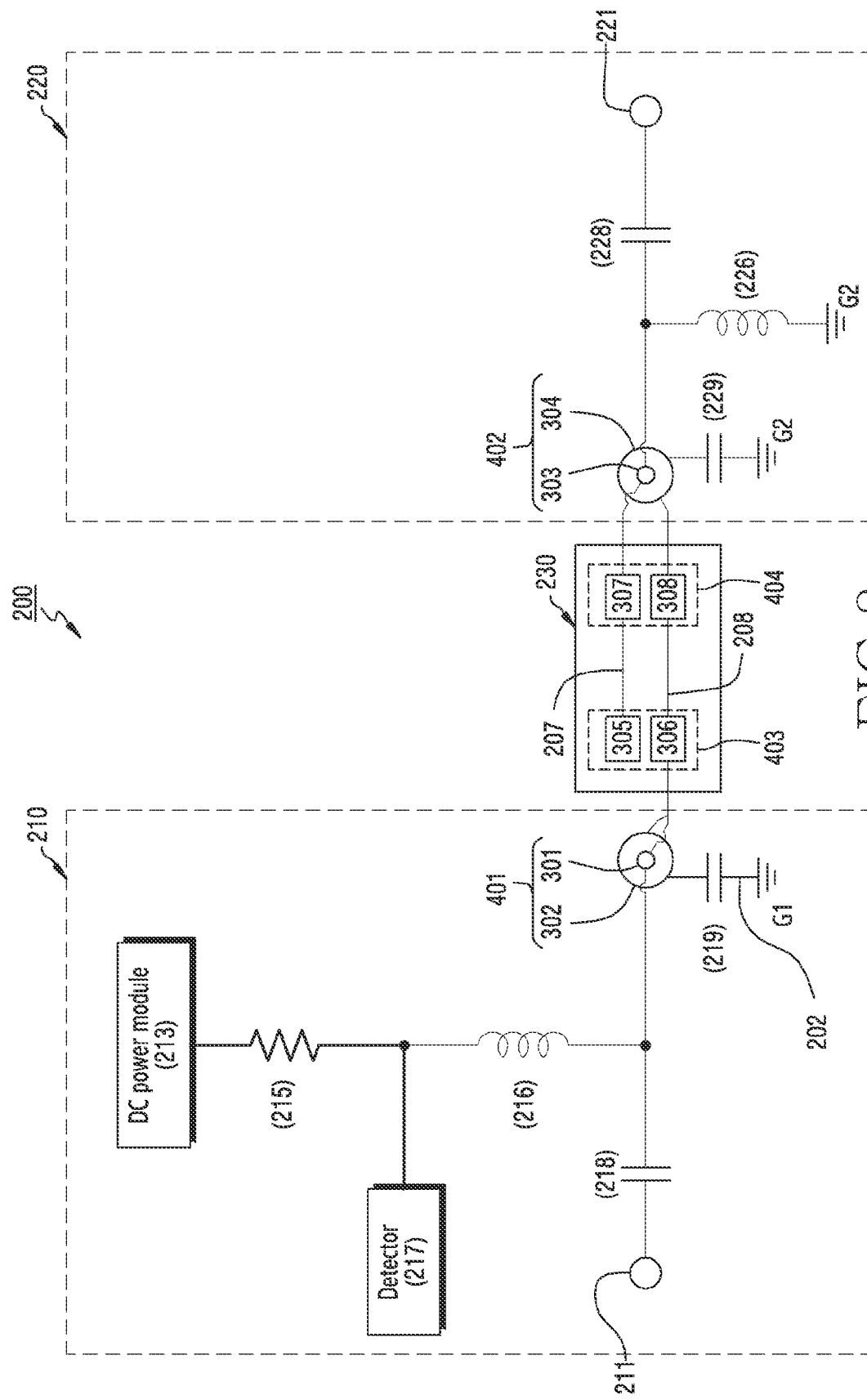
FIG. 8 illustrates a circuit for a connecting issue of FIG. 6 according to various embodiments.
Figure 9:
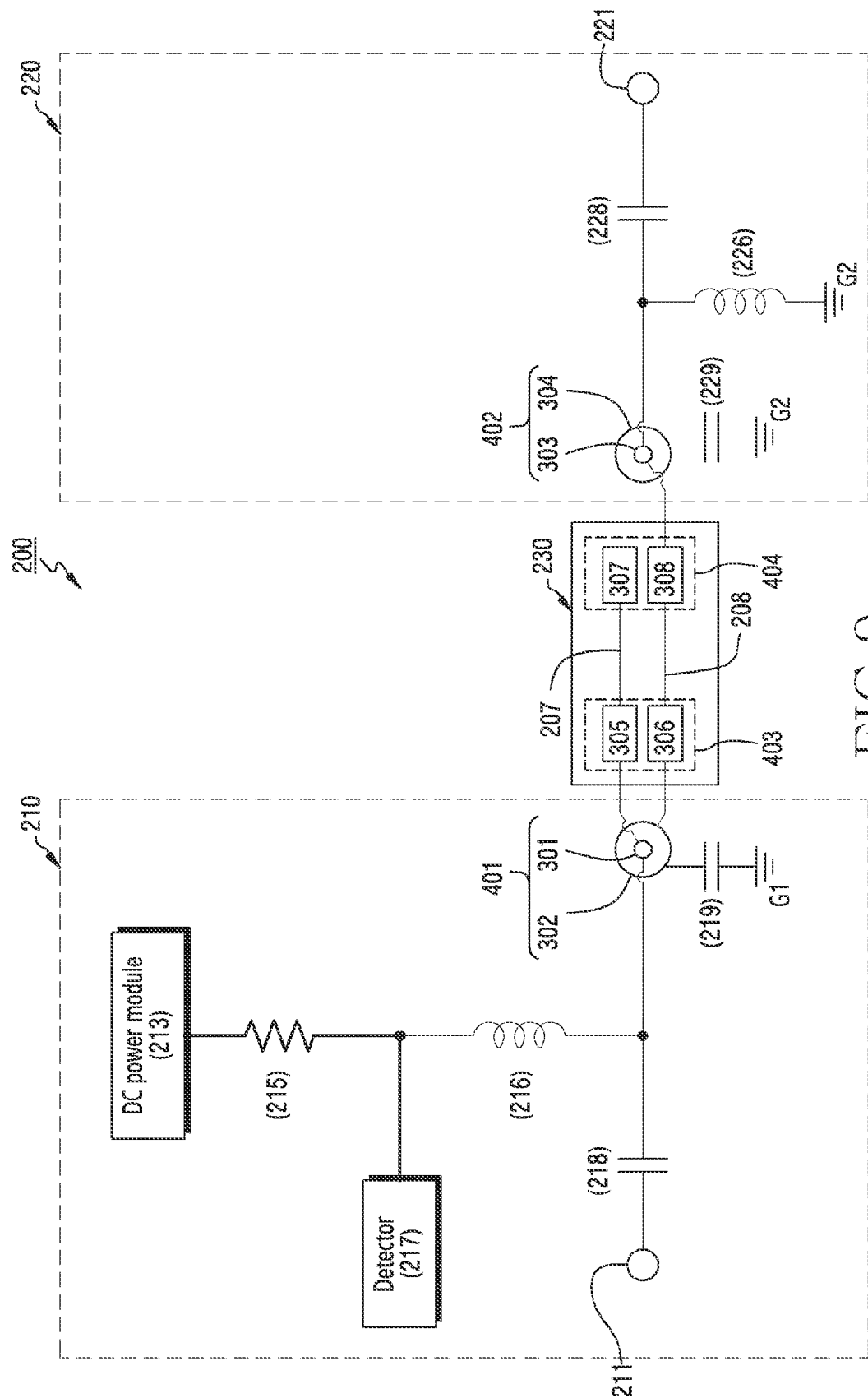
FIG. 9 illustrates a circuit for a connecting issue between a connector disposed to a conductive member and a connector disposed to a PCB according to an embodiment.

FIG. 2 illustrates a circuit for an electronic device including a plurality of PCBs which exchange a frequency signal and a conductive member which electrically couples between the plurality of PCBs according to an embodiment. FIG. 3 illustrates a conductive member, a first PCB, and a first connector according to an embodiment. FIG. 4 illustrates a conductive member according to an embodiment. FIG. 5A and FIG. 5B illustrate a circuit for a connecting issue between a connector disposed to a conductive member and a connector disposed to a PCB according to an embodiment. FIG. 6 illustrates a connecting issue between a connector disposed to a conductive member and a connector disposed to a PCB according to an embodiment. FIG. 7 illustrates a circuit for a connecting issue of FIG. 6 according to an embodiment. FIG. 8 illustrates a circuit for a connecting issue of FIG. 6 according to various embodiments. FIG. 9 illustrates a circuit for a connecting issue between a connector disposed to a conductive member and a connector disposed to a PCB according to an embodiment.

Referring to FIG. 2, in an embodiment, an electronic device 200 (e.g., the electronic device 101 of FIG. 1) may include at least one of a first PCB 210, a second PCB 220, and a conductive member 230.

According to an embodiment, the electronic device 200 may include a first connector 401 disposed to the first PCB 210 and a second connector 402 disposed to the second PCB 220. According to an embodiment, the conductive member 230 may have a shape extending from one end (not shown) including a third connector 403 electrically coupled with the first connector 401 to the other end (not shown) including a fourth connector 404 electrically coupled with the second connector 402.

According to an embodiment, the first PCB 210 and the second PCB 220 may exchange a frequency signal through the conductive member 230. The frequency signal may include a signal having the same frequency as a Radio Frequency (RF) signal or an Intermediate (IF) signal.

According to an embodiment, the first PCB 210 may include a first region 211 and a first conductive path (or a first conductive pattern) 201 between the first region 211 and the first connector 401. According to an embodiment, the second PCB 220 may include a second region 221 and a fourth conductive path (or a fourth conductive pattern) 204 between the second region 221 and the second connector 402. The first conductive path 201 and the fourth conductive path 204 may be coupled through the conductive member 230, and the first conductive path 201, the fourth conductive path 204, and the conductive member 230 may be utilized as a transmission line (or a transmission/reception circuit). The transmission line is a structure for transmitting a frequency signal (voltage, current), and may be a conductive system which uses wave transferring based on an electrical parameter (resistance, inductance, conductance, and capacitance per unit length).

According to an embodiment, the first region 211 may be electrically coupled with a wireless communication module (e.g., the wireless communication module 192 of FIG. 1). According to various embodiments, the wireless communication module may be disposed to the first PCB 210. The wireless communication module may include, for example, a baseband processor or at least one communication circuit (e.g., intermediate Frequency Circuit (IFIC) or Radio Frequency Integrate Circuit (RFIC)).

According to an embodiment, the second region 221 may be electrically coupled with at least one antenna. According to various embodiments, the at least one antenna (e.g., a conductor or a conductive pattern) may be disposed to the second PCB 220, or may be disposed to a region (e.g., a housing constructing an exterior of the electronic device 200) different from the second PCB 220.

According to various embodiments, the second PCB 220 may include an antenna array including a plurality of antenna elements. According to various embodiments, the wireless communication circuit (e.g., RFIC) may be disposed to the second PCB 220, and may be electrically coupled with the antenna array. According to various embodiments, the wireless communication circuit disposed to the first PCB 210 or the second PCB 220 may include a beam forming system which processes a transmitted or received signal so that energy radiated from an antenna element is concentrated in a specific direction in a space. The beam forming system may receive a signal with higher strength in a desired direction or transfer the signal in the desired direction, or may not receive a signal coming from an undesired direction. The beam forming system may adjust a direction and shape of a beam by using an amplitude or phase difference of a carrier signal in an RF band.

According to various embodiments, the communication module (e.g., the wireless communication module 192 of FIG. 1) electrically coupled with the first region 211 may include a first wireless communication module (not shown) or a second wireless communication module (not shown). The electronic device 200 may further include one or more interfaces between the communication module and the processor (e.g., the processor 120 of FIG. 1) to support communication between chips. The processor and the first wireless communication module or the second wireless communication module may transmit or receive data by using the interface between the chips (i.e., an inter-processor communication channel). According to an embodiment, the first wireless communication module or the second wireless communication module may provide an interface for performing communication with different entities. The first wireless communication module may support wireless communication, for example, for a first network which utilizes one or more antennas. The second wireless communication module may support wireless communication, for example, for a second network which utilizes at least one antenna module. According to an embodiment, the first network or the second network may include the network 199 of FIG. 1. According to an embodiment, the first network may include a $4^{th}$ Generation (4G) network, and the second network may include a $5^{th}$ Generation (5G) network. The 4G network may support, for example, a Long Term Evolution (LTE) protocol defined in 3GPP. The 5G network may support, for example, a New Radio (NR) protocol defined in 3GPP. According to various embodiments, the first network may relate to Wireless Fidelity (WiFi) or Global Positioning System (GPS).

According to an embodiment, the first wireless communication module electrically coupled with the first region 211 of the first PCB 210 may receive a high-frequency signal (e.g., a Radio Frequency (RF) signal) for the first network (e.g., the 4G network) through one or more antennas electrically coupled with the second region 221 of the second PCB 220, and may transmit the received RF signal to the processor (e.g., the processor 120 of FIG. 1) by modulating (e.g., down-converting) it into a low-frequency signal (hereinafter, a baseband signal). The first wireless communication module may receive a broadband signal for the first network from the processor, and may transmit the received baseband signal to the one or more antennas by modulating (e.g., up-converting) it into an RF signal. According to an embodiment, the first wireless communication module may include an RFIC. According to various embodiments, when the RF signal is modulated into the baseband signal or when the baseband signal is modulated into the RF signal, an input of a Local Oscillator (LO) (hereinafter, an LO signal) may be utilized.

According to an embodiment, the second wireless communication module electrically coupled with the first region 211 of the first PCB 210 may receive a baseband signal for the second network from the processor (e.g., the processor 120 of FIG. 1). The second wireless communication module may up-covert the baseband signal into an IF signal by utilizing the LO signal, and may transmit the IF signal to the antenna module (e.g., the second PCB 220). The antenna module may receive the IF signal from the second wireless communication module through the conductive member 230. The antenna module may up-convert the IF signal into the RF signal by utilizing the LO signal, and may transmit the RF signal to the outside through a plurality of antennas (e.g., an antenna array) included in the antenna module. According to an embodiment, the antenna module may receive the RF signal through the plurality of antennas. The antenna module may down-convert the RF signal into the IF signal by utilizing the LO signal, and may transmit the IF signal to the second wireless communication module. The second wireless communication module may receive the IF signal from the antenna module through the conductive member 230. The second wireless communication module may down-convert the IF signal into the baseband signal by utilizing the LO signal, and may transmit the baseband signal to the processor. According to an embodiment, the second wireless communication module may include an IFIC, and the antenna module may include an RFIC. The second wireless communication module may transmit and/or receive a first signal of a frequency band between about 5 GHz and about 15 GHz. According to an embodiment, the antenna module may transmit/receive a second signal of at least part (e.g., a frequency band between about 24 GHz and about 100 GHz, a frequency band between about 24 GHz and about 30 GHz, or a frequency band between about 37 GHz and about 40 GHz) of a band between about 6 GHz and about 100 GHz.

According to some embodiments, the first region 211 may be electrically coupled with a transmitter or may include the transmitter, and the second region 221 may be electrically coupled with a receiver or may include the receiver. The transmitter is a master Integrated Circuit (IC), and for example, may include the processor 120 and/or wireless communication module 192 of FIG. 1. The receiver is a slave IC, and for example, may include elements or modules (e.g., the antenna module 197 of FIG. 1) coupled with the master IC to exchange a frequency signal.

According to various embodiments, various other elements (e.g., the processor 120, memory 130, input device 150, sound output device 155, display device 160, audio module 170, sensor module 176, interface 177, haptic module 179, camera module 180, power management module 188, battery 189, communication module 190, SIM 196, or antenna module 197 of FIG. 1) may be disposed to the first PCB 210 or the second PCB 220.

According to an embodiment, the first connector 401 may include a first terminal 301 electrically coupled with the first conductive path 201 and a second terminal 302 electrically coupled with a first ground G1 of the first PCB 210. The first PCB 210 may include a second conductive path (or second conductive pattern) 202 between the second terminal 302 and the first ground G1. The first terminal 301 and the second terminal 302 may be electrically or physically separated.

According to an embodiment, the second connector 402 may include a third terminal 303 electrically coupled with the fourth conductive path 204 and a fourth terminal 304 electrically coupled with a second ground G2 of the second PCB 220. The second PCB 220 may include a fifth conductive path (or fifth conductive pattern) 205 between the fourth terminal 304 and the second ground G2. The third terminal 303 and the fourth terminal 304 may be electrically or physically separated.

According to an embodiment, the third connector 403 may include a fifth terminal 305 and a sixth terminal 306, and the fourth connector 404 may include a seventh terminal 307 and an eighth terminal 308. The conductive member 230 may include a seventh conductive path 207 which electrically couples the fifth terminal 305 and the seventh terminal 307 and an eighth conductive path 208 which electrically couples the sixth terminal 306 and the eighth terminal 308. When the first connector 401 and the third connector 403 are in a normal connection state, the first terminal 301 may be electrically coupled with the fifth terminal 305, and the second terminal 302 may be electrically coupled with the sixth terminal 306. When the second connector 402 and the fourth connector 402 are in the normal connection state, the third terminal 303 may be electrically coupled with the seventh terminal 307, and the fourth terminal 304 may be electrically coupled with the eighth terminal 308.

Referring to FIG. 3, in an embodiment, the first connector 401 may include a female connector for coaxial cable. For example, the first connector 401 may include a support member 360 and the first and second terminals 301 and 302 coupled to the support member 360 and electrically or physically separated from each other. The support member 360 may be a plate constructed of an insulating material such as a polymer. The first terminal 301 and the second terminal 302 may protrude from a first face 360a of the support member 360. The first terminal 301 may be constructed in a pin shape, and the second terminal 302 may be constructed in a shape surrounding the first terminal 301. The first connector 401 may be disposed to the first PCB 210 such that a second face (e.g., a face opposite to the first face 360a) of the support member 360 faces the first PCB 210. According to an embodiment, the first connector 401 may include a first portion 301a extending from the first terminal 301 and coupled with the first PCB 210. For example, the first portion (e.g., a pad) 301a may be coupled with a land (not shown) disposed on the first PCB 210 by using a conductive material 370 such as a solder. Accordingly, the first terminal 301 may be electrically coupled with the first PCB 210. According to an embodiment, the first connector 401 may include a second portion 302a extending from the second terminal 302 and coupled with the first PCB 210. For example, the second portion (e.g., a pad) 302a may be coupled with a land (not shown) disposed on the first PCB 210 by using the conductive material 370 such as a solder. Accordingly, the second terminal 302 may be electrically coupled with the first PCB 210.

Referring to FIG. 3 and FIG. 4, in an embodiment, the conductive member 230 may include a coaxial cable 319 and the third connector 403 coupled to the coaxial cable 319. The third connector 403 may include a male connector for coaxial cable. The male connector for coaxial cable may include a structure used to mechanically and electrically couple the coaxial cable 319 to a female connector for coaxial cable (e.g., the first connector 401). For example, the third connector 403 may include the fifth terminal 305 corresponding to the first terminal 301 of the first connector 401 and the sixth terminal 306 corresponding to the second terminal 302 of the first connector 401. According to an embodiment, the fifth terminal 305 may be constructed to be in contact elastically with the first terminal 301 while inserting the first terminal 301 of a pin shape when the first connector 401 and the third connector 403 are coupled. According to an embodiment, the sixth terminal 306 may be configured to be in contact elastically with the second terminal 302 while at least surrounding the second terminal 302 when the first connector 401 and the third connector 403 are coupled.

According to various embodiments, the second connector 402 of FIG. 2 may be disposed to the second PCB 220 as substantially the same element as the first connector 401, and detailed descriptions thereof will be omitted. According to various embodiments, the fourth connector 404 of FIG. 2 may be coupled with a coaxial cable (e.g., the coaxial cable 319 of FIG. 3) as substantially the same element as the third connector 403, and detailed descriptions thereof will be omitted.

According to various embodiments, the conductive member 230 may be implemented as various other conductive members replacing a coaxial cable, a female connector for coaxial cable, and a male connector for coaxial cable.

Referring to FIG. 2, in an embodiment, when the third connector 403 is coupled with the first connector 401 and when the fourth connector 404 is coupled with the second connector 402, the first region 211 and the second region 221 may exchange a frequency signal (e.g., an RF signal or an if signal) for wireless communication through a transmission line constructed by the first conductive path 201, the fourth conductive path 204, and the seventh conductive path 207.

According to an embodiment, when the third connector 403 is coupled with the first connector 401 and when the fourth connector 404 is coupled with the second connector 402, the eighth conductive path 208 may be electrically coupled with the first ground G1 of the first PCB 210 and the second ground G2 of the second PCB 220. The eighth conductive path 208 electrically coupled with the first and second grounds G1 and G2 may reduce an effect of electromagnetic noise (e.g., electromagnetic wave noise) generated inside of the electronic device 200 or introduced from the outside of the electronic device 200 when a frequency signal is transmitted/received (or exchanged) through the seventh conductive path 207.

According to various embodiments, the eighth conductive path 208 electrically coupled with the first and second grounds G1 and G2 may reduce Electro Magnetic Interference (EMI) between the conductive member 230 and other components (e.g., at least one antenna). The eighth conductive path 208 electrically coupled with the first and second grounds G1 and G2 may reduce, for example, a loss for signals transmitted/received between the first region 211 and the second region 221.

According to various embodiments, when power, a signal, or data is transmitted/received through the seventh conductive path 207 between the first region 211 and the second region 221, an electric field may be produced in the seventh conductive path 207 due to a current flow. Such an electric field may apply noise to a peripheral circuit, thereby causing EMI which interferes with a normal operation of a peripheral circuit. The eighth conductive path 208 electrically coupled with the first and second grounds G1 and G2 may reduce the EMI. For example, the electronic device 200 may include a camera module disposed adjacent to or around the conductive member 230. When the eighth conductive path 208 is electrically coupled with the first and second grounds G1 and G2, an electromagnetic effect on an operation clock of the camera module may be reduced.

According to an embodiment, the first PCB 210 may include a Direct Current (DC) power module 213 and a third conductive path (or a third conductive pattern) 203 which couples the DC power module 213 and the first conductive path 201. The DC power module 213 is an element for providing DC power, and, for example, may convert Alternating Current (AC) power to DC power (e.g., AC-DC converting) or may convert DC power of a specific voltage to DC power of another voltage (e.g., DC-DC converting). For example, although the DC power module 213 may output DC voltage of about 5V (volts), without being limited thereto, DC voltage of various other values may be output.

According to an embodiment, the first PCB 210 may include at least one first inductor 216 electrically coupled with the third conductive path 203. When an AC-type frequency signal is exchanged between the first region 211 and the second region 221, the at least one first inductor 216 may reduce or prevent a loss or deformation of the frequency signal due to a circuit (e.g., the DC power module 213, a detector 217) coupled with a transmission line between the first region 211 and the second region 221. According to an embodiment, when an AC-type frequency signal is exchanged between the first region 211 and the second region 221, the at least one first inductor 216 may block the frequency signal from being transferred to the DC power module 213 and/or the detector 217 through the third conductive path 203 (e.g., AC blocking).

According to an embodiment, the second PCB 220 may include the sixth conductive path (or sixth conductive pattern) 206 which couples the fourth conductive path 204 and the second ground G2. According to an embodiment, the second PCB 220 may include at least one second inductor 226 electrically coupled with the sixth conductive path 206. When an AC-type frequency signal is exchanged between the first region 211 and the second region 221, the at least one second inductor 226 may reduce or prevent a loss or deformation of the frequency signal due to the second ground G2 coupled with a transmission line between the first region 211 and the second region 221. According to an embodiment, when an AC-type frequency signal is exchanged between the first region 211 and the second region 221, the at least one second inductor 226 may block the frequency signal from being transferred to the second ground G2 through the sixth conductive path 206 (e.g., AC blocking).

According to an embodiment, the first PCB 210 may include the detector 217 and a ninth conductive path (or a ninth conductive pattern) 209 which electrically couples the detector 217 and the third conductive path 203. According to an embodiment, the first PCB 210 may include at least one resistor 215 electrically coupled with the third conductive path 203. The at least one resistor 215 may be disposed between the detector 217 and the DC power module 213, and may be referred to as a pull-up resistor. According to some embodiments (not shown), the at least one resistor 215 may be implemented as a pull-down resistor disposed between the detector 217 and the at least one first inductor 216.

According to an embodiment, the first PCB 210 may include at least one first capacitor 218 electrically coupled with the first conductive path 201 between the first region 211 and the first terminal 301. The at least one first capacitor 218 may reduce or prevent a loss or deformation of a frequency signal exchanged between the first region 211 and the second region 221 due to a DC signal output from the DC power module 213. According to an embodiment, the at least one first capacitor 218 may block the DC signal output from the DC power module 213 from being transferred to the first region 211 (e.g., DC blocking).

According to an embodiment, the second PCB 220 may include at least one second capacitor 228 electrically coupled with the fourth conductive path 204 between the second region 221 and the third terminal 303. The at least one second capacitor 228 may reduce or prevent a loss or deformation of a frequency signal exchanged between the first region 211 and the second region 221 due to a DC signal output from the DC power module 213. According to an embodiment, the at least one second capacitor 228 may block the DC signal output from the DC power module 213 from being transferred to the second region 221 (e.g., DC blocking).

According to an embodiment, the detector 217 may detect a connecting issue between the first connector 401 and the third connector 402 and/or a connecting issue between the second connector 402 and the fourth connector 402 on the basis of DC voltage input to the detector 217.

For example, as shown in FIG. 2, when the first and third connectors 401 and 403 and the second and fourth connectors 402 and 404 are in a normal connection state, the first terminal 301 may be electrically coupled with the fifth terminal 305, the second terminal 302 may be electrically coupled with the sixth terminal 306, the third terminal 303 may be electrically coupled with the seventh terminal 307, and the fourth terminal 304 may be electrically coupled with the eighth terminal 308. In the normal connection state, a DC signal output from the DC power module 213 may be transferred to the second ground G2 through the at least one resistor 215, the at least one first inductor 216, and the at least one second inductor 226. Accordingly, the detector 217 may detect a low signal (e.g., 0V) for the normal connection state.

For example, referring to FIG. 5A, when there is a connecting issue between the first connector 401 and the third connector 403, the first terminal 310 may not be electrically coupled with the fifth terminal 305. For example, referring to FIG. 5B, when there is a connecting issue between the second connector 402 and the fourth connector 404, the third terminal 303 may not be electrically coupled with the seventh terminal 307. When there is the connecting issue as shown in FIG. 5A or FIG. 5B, a DC signal output from the DC power module 213 may be transferred to the detector 217 through the at least one resistor 215. Accordingly, the detector 217 may detect a high signal (e.g., 5V) for the connecting issue.

For example, referring to FIG. 6, the first connector 401 may include the first terminal 301, the second terminal 302, and the support member 360. The first portion 301a extending from the first terminal 301 and the second portion 302a extending from the second terminal 302 may be coupled to the first PCB 210 by using the conductive material 370 such as a solder. When a connecting issue occurs between the third connector 403 and the first connector 401, the sixth terminal 306 of the third connector 403 may be electrically coupled with the first terminal 301 of the first connector 401. In an embodiment, referring to FIG. 7, the second PCB 220 may include at least one third capacitor 229 electrically coupled with the fifth conductive path 206 between the fourth terminal 304 and the second ground G2. Although the second connector 402 and the fourth connector 404 are in the normal connection state, as shown in FIG. 6, the first terminal 301 may be electrically coupled with the sixth terminal 306 due to the connecting issue between the first connector 401 and the third connector 403. According to an embodiment, when there is a connecting issue as shown in FIG. 7, the at least one third capacitor 229 may block a DC signal output from the DC power module 213 from being transferred to the second ground G2 (e.g., DC blocking). Accordingly, the DC signal output from the DC power module 213 may be transferred to the detector 217 through the at least one resistor 215. Therefore, the detector 217 may detect a high signal for the connecting issue. Assuming that the at least one third capacitor 229 is omitted in the circuit of FIG. 7, the detector 217 may have difficulty in detecting a connecting issue for a connection with the first terminal 301, not the specified second terminal 302 of the first connector 401. For example, assuming that the at least one third capacitor 229 is omitted in the circuit of FIG. 7, the DC signal output from the DC power module 213 may be transferred to the second ground G2 through the fourth conductive path 204, and although the first terminal 301 is electrically coupled with the sixth terminal 306 due to the connecting issue between the first connector 401 and the third connector 403, the detector 217 may erroneously detect a low signal for the normal connection state. According to an embodiment, the at least one third capacitor 229 may prevent such a detection error.

For example, referring to FIG. 6, when a connecting issue occurs between the third connector 403 and the first connector 401, the sixth terminal 306 of the third connector 403 may be electrically coupled not only with the first terminal 301 of the first connector 401 but also with the second terminal 302 of the first connector 401. In an embodiment, referring to FIG. 8, the first PCB 210 may include at least one fourth capacitor 219 electrically coupled with the second conductive path 202 between the second terminal 302 and the first ground G1. Although the second connector 402 and the fourth connector 404 are in the normal connection state, as shown in FIG. 6 the sixth terminal 306 may be electrically coupled both with the first terminal 301 and the second terminal 302 due to the connecting issue between the first connector 401 and the third connector 403. According to an embodiment, when there is a connecting issue as shown in FIG. 8, the at least one fourth capacitor 219 may block a DC signal output from the DC power module 213 from being transferred to the first ground G1 (e.g., DC blocking). Accordingly, the DC signal output from the DC power module 213 may be transferred to the detector 217 through the at least one resistor 215. Therefore, the detector 217 may detect a high signal for the connecting issue. Assuming that the at least one fourth capacitor 219 is omitted in the circuit of FIG. 8, the detector 217 may have difficulty in detecting a connecting issue for a connection with all of the first terminal 301 and second terminal 302 of the first connector 401. For example, assuming that the at least one fourth capacitor 219 is omitted in the circuit of FIG. 8, the DC signal output from the DC power module 213 may be transferred to the first ground G1 through the second conductive path 202, and although the sixth terminal 306 is electrically coupled both with the first terminal 301 and the second terminal 302 due to the connecting issue between the first connector 401 and the third connector 403, the detector 217 may erroneously detect a low signal for a normal connection state. According to an embodiment, the at least one fourth capacitor 219 may prevent such a detection error.

For example, referring to FIG. 9, although the first connector 401 and the third connector 403 are in the normal connection state, the third terminal 303 may be electrically coupled with the eighth terminal 308 due to the connecting issue between the second connector 402 and the fourth connector 404. When there is a connecting issue as shown in FIG. 9, a DC signal output from the DC power module 213 may be transferred to the detector 217 through the at least one resistor 215. Therefore, the detector 217 may detect a high signal for the connecting issue.

Referring to FIG. 5A, 5B, 7, 8, or 9, in an embodiment, the detector 217 may be electrically coupled with a processor (e.g., the processor 120 of FIG. 1). The detector 217 may provide the processor with a signal for a connecting issue between the first connector 401 and the third connector 403 or a connecting issue between the second connector 402 and the fourth connector 404. The processor may perform a corresponding operation based on instructions stored in a memory (e.g., the memory 130 of FIG. 1). For example, when the processor receives the signal for the connecting issue from the detector 217, the instructions may include a routine for outputting information on the connecting issue through an output device such as a display (e.g., the display device 160 or sound output device 155 of FIG. 1). An operation of outputting the information on the connecting issue through the output device may prompt a user to take a countermeasure against a connecting issue between the conductive member 230 and the PCB 210 or 220. According to various embodiments, the processor (e.g., the processor 120 of FIG. 1) may be implemented to include the detector 217. For example, the processor may include a region for executing a function of detecting a connecting issue between connectors. According to various embodiments, the detector 217 may be replaced with the processor.

According to an embodiment, the processor (e.g., the processor 120 of FIG. 1) may be operatively coupled with the memory (e.g., the memory 130 of FIG. 1). The processor may perform an operation (or routine) related to detection of a connecting issue between connectors, based on the instructions stored in the memory. For example, the memory may store an instruction, when executed, causing the processor to be coupled with the third conductive path 203. The memory may store an instruction, when executed, causing the processor to detect a connecting issue between the first connector 401 and the third connector 403, or a connecting issue between the second connector 402 and the fourth connector 404, based on DC voltage input to the processor.

Figure 10:
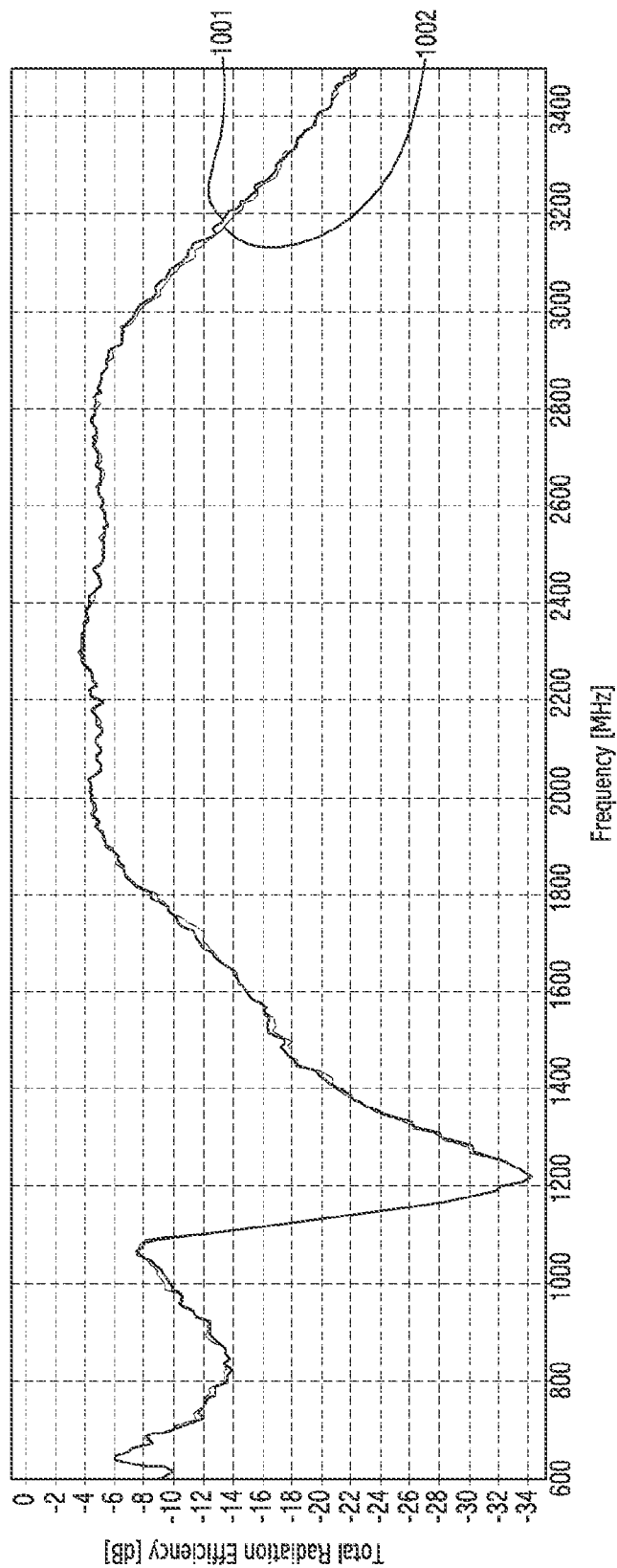
FIG. 10 is a graph for radiation efficiency of the electronic device of FIG. 2 according to an embodiment.

FIG. 10 is a graph for radiation efficiency of the electronic device of FIG. 2 according to an embodiment.

Referring to FIG. 2 and FIG. 10, a reference numeral 1001 denotes radiation efficiency when the first and third connectors 401 and 403 and the second and fourth connectors 402 and 404 are in a normal connection state. A reference numeral 1002 denotes radiation efficiency when the at least one third capacitor 229 or the at least one fourth capacitor 219 is omitted in the electronic device 200 of FIG. 2. Comparing the reference numerals 1001 and 1002, even if the at least one third capacitor 229 and/or the at least one fourth capacity 219 are added, radiation efficiency may have a difference less than or equal to a threshold (e.g., about 2 dB) in various frequency bands.

For example, the electronic device 200 of FIG. 2 may include at least one antenna (e.g., the antenna module 197 of FIG. 1) which utilizes a transmission line (e.g., the first conductive path 201, the second conductive path 202, and the eighth conductive path 208) constructed by the first PCB 210, the second PCB 220, and the conductive member 230. An impedance of at least one antenna may be related to radiation efficiency. The impedance of the at least one antenna may be related to power transferring from a transmitter to at least one antenna or power transferring from the at least one antenna to a receiver. In order to minimize reflection at a connection portion between the transmission line and at least one antenna, the impedance of the at least one antenna may be designed to match an impedance of the transmission line. Accordingly, maximum power transferring (or power loss minimization) or efficient signal transferring may be possible through the at least one antenna. Impedance mismatching may lead to a power loss or a decrease in a transmitted/received signal, thereby reducing communication performance, whereas impedance matching may lead to an efficient signal flow at a specific frequency (or a resonant frequency). According to an embodiment, when the at least one third capacitor 229 and/or the at least one fourth capacitor 219 are added, an impedance variation of the transmission line may be in a critical range for radiation efficiency in a set range, or may be substantially close to zero.

In various embodiments, referring to FIG. 2, the at least one third capacitor 229 and/or the at least one fourth capacitor 219 may be utilized as a frequency adjustment circuit. The frequency adjustment circuit may move a resonant frequency of at least one antenna, which utilizes a transmission line constructed, for example, by the first PCB 210, the second PCB 220, and the conductive member 230, to a specified frequency or by a specified level. The at least one third capacitor 229 and/or the at least one fourth capacitor 219 may apply capacitance (or capacitance component) on the transmission line constructed by the first PCB 210, the second PCB 220, and the conductive member 230 (e.g., capacitance loading (or capacitance loading effect)).

In an embodiment, a frequency band which can be utilized by the electronic device 200 of FIG. 2 may include a Low Band (LB) (about 600~1 GHz), a Middle Band (MB) (about 1~2.2 GHz), a High Band (HB) (about 2.2~2.7 GHz), or Ultra High Band (UHB) (about 2.7~3.6 GHz). According to various embodiments, the electronic device 200 may further utilize other frequency bands. According to an embodiment, the transmission line constructed by the first PCB 210, the second PCB 220, and the conductive member 230 may correspond to a transmission line supporting a communication mode which uses the LB, the MB, the HB, or the UHB. For example, the transmission line constructed by the first PCB 210, the second PCB 220, and the conductive member 230 may support various communication services such as a Global System for Mobile communication (GSM), LTE, or 5G network utilizing a corresponding frequency band. In various embodiments, referring to FIG. 2, the at least one third capacitor 229 and/or the at least one fourth capacitor 219 may be replaced with a variable capacitor. The processor (e.g., the processor 120 of FIG. 1) may control the variable capacitor based on a communication mode which utilizes a corresponding frequency band, and the variable capacitor may apply capacitance of a corresponding value to the transmission line (e.g., capacitance loading).

Referring to FIG. 2, in various embodiments, the first PCB 210 and the second PCB 220 may be constructed as one PCB, and the conductive member 230 may electrically couple the first connector 401 and second connector 402 on one PCB. When the first PCB 210 and the second PCB 220 are constructed as one PCB, the first ground G1 and the second ground G2 may be substantially identical. Even if the first PCB 210 and the second PCB 220 are constructed as one PCB, the detector 217 may detect a connecting issue between the first connector 401 and the third connector 403 or a connection detect between the second connector 402 and the fourth connector 404, based on DC voltage input to the detector 217.

According to an embodiment of the disclosure, an electronic device (e.g., the electronic device 200 of FIG. 2) may include the first PCB 210. The first PCB may include a wireless communication circuit (e.g., the first region 211 of FIG. 2). The first PCB may include a first connector (e.g., the first connector 401 of FIG. 2) which includes a first terminal (e.g., the first terminal 301 of FIG. 2) and a second terminal (e.g., the second terminal 302 of FIG. 2). The first PCB may include a first conductive path (e.g., the first conductive path 201 of FIG. 2) which couples the wireless communication circuit and the first terminal and a second conductive path (e.g., the second conductive path 202 of FIG. 2) which couples a first ground (e.g., the first ground G1 of FIG. 2) and the second terminal. The first PCB may include a third conductive path (e.g., the third conductive path 203 of FIG. 2) which couples a Direct Current (DC) power source (e.g., the DC power module 213 of FIG. 2) and the first conductive path, and at least one resistor (e.g., the at least one resistor 215 of FIG. 2) and at least one first inductor (e.g., the at least one first inductor 216 of FIG. 2) coupled with the third conductive path. The electronic device may include a second PCB (e.g., the second PCB 220 of FIG. 2) electrically coupled with to at least one antenna. The second PCB may include a second connector (e.g., the second connector 402 of FIG. 2) which includes a third terminal (e.g., the third terminal 303 of FIG. 2) and a fourth terminal (e.g., the fourth terminal 304 of FIG. 2). The second PCB may include a fourth conductive path (e.g., the fourth conductive path 204 of FIG. 2) which couples the at least one antenna and the third terminal, and a fifth conductive path (e.g., the fifth conductive path 205 of FIG. 2) which couples a second ground (e.g., the second ground G2 of FIG. 2) and the fourth terminal. The second PCB may include at least one capacitor (e.g., the at least one third capacitor 229 of FIG. 2) coupled with the fifth conductive path. The second PCB may include a sixth conductive path (e.g., the sixth conductive path 206 of FIG. 2) which couples the second ground and the fourth conductive path, and at least one second inductor (e.g., the at least one second inductor 226 of FIG. 2) coupled with the sixth conductive path. The electronic device may include a conductive member (e.g., the conductive member 230 of FIG. 2). The conductive member may include a third connector (e.g., the third connector 403 of FIG. 2) capable of electrically coupling with the first connector and a fourth connector (e.g., the fourth connector 404 of FIG. 2) capable of electrically coupling with the second connector. The conductive member may transfer a frequency signal between the wireless communication circuit and the at least one antenna. The electronic device may include a processor (e.g., the processor 120 of FIG. 1 or the detector 217 of FIG. 2) electrically coupled with to the first PCB. The electronic device may include a memory (e.g., the memory 130 of FIG. 1) operatively coupled with the processor. The memory may store instructions, when executed, causing the processor to couple with the third conductive path and detect, on the basis of a DC voltage input to the processor, a connecting issue between the first connector and the third connector or a connecting issue between the second connector and the fourth connector.

According to an embodiment of the disclosure, the first PCB may further include one capacitor (e.g., the at least one fourth capacitor 219 of FIG. 2) coupled with the second conductive path.

According to an embodiment of the disclosure, the first PCB may further include one capacitor (e.g., the at least one first capacitor 218 of FIG. 2) coupled with the first conductive path.

According to an embodiment of the disclosure, the second PCB may further include one capacitor (e.g., the at least one second capacitor 228 of FIG. 2) coupled with the fourth conductive path.

According to an embodiment of the disclosure, the processor (e.g., the detector 217 of FIG. 2) may be coupled between the at least one resistor and the at least one first inductor.

According to an embodiment of the disclosure, the at least one resistor (e.g., the at least one resistor 215 of FIG. 2) may be coupled between the DC power and the processor.

According to an embodiment of the disclosure, the conductive member (e.g., the conductive member 230 of FIG. 3) may include a coaxial cable (e.g., the coaxial cable 319 of FIG. 3) which electrically couples the third connector and the fourth connector.

According to an embodiment of the disclosure, the third connector may include a fifth terminal (e.g., the fifth terminal 305 of FIG. 2) and a sixth terminal (e.g., the sixth terminal 306 of FIG. 2). The fourth connector may include a seventh terminal (e.g., the seventh terminal 307 of FIG. 2) and an eighth connector (e.g., the eighth terminal 308 of FIG. 2). The conductive member may include a seventh conductive path (e.g., the seventh conductive path 207 of FIG. 2) which electrically couples the fifth terminal and the seventh terminal. The conductive member may include an eighth conductive path (e.g., the eighth conductive path 208 of FIG. 2) which electrically couples the sixth terminal and the eighth terminal.

According to an embodiment of the disclosure, the connecting issue between the first connector (e.g., the first connector 401 of FIG. 2) and the third connector (e.g., the third connector 403 of FIG. 2) may include a state in which the first terminal (e.g., the first terminal 301 of FIG. 2) is not electrically coupled with the fifth terminal specified out of the fifth terminal (e.g., the fifth terminal 305 of FIG. 2) and the sixth terminal (e.g., the sixth terminal 306 of FIG. 2), or is electrically coupled with the sixth terminal. According to an embodiment of the disclosure, the connecting issue between the second connector (e.g., the second connector 402 of FIG. 2) and the fourth connector (e.g., the fourth connector 404 of FIG. 2) may include a state in which the third terminal (e.g., the third terminal 303 of FIG. 2) is not electrically coupled with the seventh terminal specified out of the seventh terminal (e.g., the seventh terminal 307 of FIG. 2) and the eighth terminal (e.g., the eighth terminal 308 of FIG. 2), or is electrically coupled with the eight terminal.

According to an embodiment of the disclosure, the instructions may cause the processor (e.g., the detector 217 of FIG. 2) to detect the connecting issue between the first connector (e.g., the first connector 401 of FIG. 2) and the third connector (e.g., the third connector 403 of FIG. 2) or the connecting issue between the second connector (e.g., the second connector 402 of FIG. 2) and the fourth connector (e.g., the fourth connector 404 of FIG. 2), when the DC voltage input to the processor is a high signal.

According to an embodiment of the disclosure, the instructions may cause the processor (e.g., the processor 120 of FIG. 1 or the detector 217 of FIG. 2) to output information on the connecting issue through a display (e.g., the display device 160 of FIG. 1) included in the electronic device, when the connecting issue between the first connector and the third connector or the connecting issue between the second connector and the fourth connector is detected.

According to an embodiment of the disclosure, the at least one antenna may be disposed to the second PCB (e.g., the second PCB 220 of FIG. 2).

According to an embodiment of the disclosure, the at least one antenna may include an antenna array.

According to an embodiment of the disclosure, the electronic device may further include a wireless communication circuit disposed to the second PCB (e.g., the second PCB 220 of FIG. 2).

According to an embodiment of the disclosure, the wireless communication circuit disposed to the first PCB may include an Intermediate Frequency Integrated Circuit (IFIC). The wireless communication circuit disposed to the second PCB may include a Radio Frequency Integrated Circuit (RFIC).

According to an embodiment of the disclosure, the wireless communication circuit disposed to the first PCB may transmit and/or receive a frequency signal between 5 GHz and 15 GHz. The wireless communication circuit disposed to the second PCB may transmit and/or receive a frequency signal between 24 GHz and 100 GHz.

According to an embodiment of the disclosure, the wireless communication circuit disposed to the second PCB may include a first electric path to be electrically coupled with a first point on a first antenna element of the antenna array, and a second electric path to be electrically coupled with a second point on a second element of the antenna array. The wireless communication circuit disposed to the second PCB may provide a phase difference between a first signal at the first point and a second signal at the second point.

According to an embodiment of the disclosure, the at least one capacitor (e.g., the at least one third capacitor 229 of FIG. 2) may include a variable capacitor. The instructions may cause the processor (e.g., the processor 120 of FIG. 1) to control the variable capacitor, based on the frequency signal.

According to an embodiment of the disclosure, the first PCB of FIG. 2 and the second PCB 220 of FIG. 2 may be constructed as one PCB. The PCB may include a wireless communication circuit, a first connector which includes a first terminal (e.g., the first terminal 301 of FIG. 2) and a second terminal (e.g., the second terminal 302 of FIG. 2), a first conductive path (the first conductive path 201 of FIG. 2) which couples the wireless communication circuit and the first terminal, and a second conductive path (e.g., the second conductive path 202 of FIG. 2) which couples a ground and the second terminal. The PCB may include a third conductive path (e.g., the third conductive path 203 of FIG. 2) which couples a DC power source (e.g., the DC power module 213 of FIG. 2) and the first conductive path, and at least one resistor (e.g., the at least one resistor 215 of FIG. 2) and at least one first inductor (e.g., the at least one first inductor 216 of FIG. 2) coupled with the third conductive path. The PCB may include a second connector (e.g., the second connector 402 of FIG. 2) which includes a third terminal (e.g., the third terminal 303 of FIG. 2) and a fourth terminal (e.g., the fourth terminal 304 of FIG. 2). The PCB may include a fourth conductive path (e.g., the fourth conductive path 204 of FIG. 3) which couples the at least one antenna and the third terminal, and a fifth conductive path (e.g., the fifth conductive path 205 of FIG. 2) which couples the ground and the fourth terminal. The PCB may include at least one capacitor (e.g., the at least one third capacitor 229 of FIG. 2) coupled with the fifth conductive path, a sixth conductive path (e.g., the sixth conductive path 206 of FIG. 2) which couples the ground and the fourth conductive path, and at least one second inductor (e.g., the at least one second inductor 226 of FIG. 2) coupled with the sixth conductive path. A conductive member (e.g., the conductive member 230 of FIG. 2) may include a third connector (e.g., the third connector 403 of FIG. 2) capable of electrically coupling with the first connector and a fourth connector (e.g., the fourth connector 404 of FIG. 2) capable of electrically coupling with the second connector. The conductive member may transfer a frequency signal between the wireless communication circuit and the at least one antenna. The electronic device may include a processor (e.g., the processor 120 of FIG. 1 or the detector 217 of FIG. 2) electrically coupled with the PCB. The electronic device may include a memory (e.g., the memory 130 of FIG. 1) operatively coupled with the processor. The memory may store instructions, when executed, causing the processor to couple with the third conductive path and detect, on the basis of a DC voltage input to the processor, a connecting issue between the first connector and the third connector or a connecting issue between the second connector and the fourth connector.

According to an embodiment of the disclosure, the PCB may further include at least one capacitor (e.g., the at least one fourth capacitor 219 of FIG. 2) coupled with the second conductive path (e.g., the second conductive path 202 of FIG. 2).

Various embodiments of the present disclosure disclosed in the present specification and the drawing are merely a specific example presented for clarity and are not intended to limit the scope of the embodiments of the present disclosure. Therefore, in addition to the embodiments disclosed herein, various changes in forms and details made without departing from the technical concept of the various embodiments of the present disclosure will be construed as being included in the scope of the various embodiments of the present disclosure.

The invention claimed is:
1. An electronic device comprising:
a first printed circuit board (PCB), wherein the first PCB comprises:
a wireless communication circuit;
a first connector which comprises a first terminal and a second terminal;
a first conductive path which couples the wireless communication circuit and the first terminal;
a second conductive path which couples a first ground and the second terminal;
a third conductive path which couples a direct current (DC) power source and the first conductive path, and
at least one resistor and at least one first inductor coupled with the third conductive path; and
a second PCB electrically coupled with to at least one antenna, wherein the second PCB comprises:
a second connector which comprises a third terminal and a fourth terminal;
a fourth conductive path which couples the at least one antenna and the third terminal;
a fifth conductive path which couples a second ground and the fourth terminal;
at least one capacitor coupled with the fifth conductive path;
a sixth conductive path which couples the second ground and the fourth conductive path; and
at least one second inductor coupled with the sixth conductive path;
a conductive member comprising:
a third connector capable of electrically coupling with the first connector; and
a fourth connector capable of electrically coupling with the second connector, and transfers a frequency signal between the wireless communication circuit and the at least one antenna;
a processor electrically coupled with to the first PCB; and
a memory operatively coupled with the processor,
wherein the memory stores instructions, when executed, cause the processor to:
couple with the third conductive path; and
detect, on the basis of a DC voltage input to the processor, a connecting issue between the first connector and the third connector or a connecting issue between the second connector and the fourth connector.

2. The electronic device of claim 1, wherein the at least one resistor is coupled between the DC power and the processor.

3. The electronic device of claim 1, wherein the conductive member comprises a coaxial cable which electrically couples the third connector and the fourth connector.

4. The electronic device of claim 1,
wherein the third connector comprises a fifth terminal and a sixth terminal,
wherein the fourth connector comprises a seventh terminal and an eighth connector,
wherein the conductive member comprises:
a seventh conductive path which electrically couples the fifth terminal and the seventh terminal; and
an eighth conductive path which electrically couples the sixth terminal and the eighth terminal.

5. The electronic device of claim 4,
wherein the connecting issue between the first connector and the third connector comprises a state in which the first terminal is not electrically coupled with the fifth terminal specified out of the fifth terminal and the sixth terminal, or is electrically coupled with the sixth terminal, and
wherein the connecting issue between the second connector and the fourth connector comprises a state in which the third terminal is not electrically coupled with the seventh terminal specified out of the seventh terminal and the eighth terminal, or is electrically coupled with the eight terminal.

6. The electronic device of claim 1, wherein the instructions cause the processor to detect the connecting issue between the first connector and the third connector or the connecting issue between the second connector and the fourth connector, when the DC voltage input to the processor is a high signal.

7. The electronic device of claim 1, wherein the instructions cause the processor to output information on the connecting issue through a display comprised in the electronic device, when the connecting issue between the first connector and the third connector or the connecting issue between the second connector and the fourth connector is detected.

8. The electronic device of claim 1, wherein the at least one antenna is disposed to the second PCB.

9. The electronic device of claim 8, wherein the at least one antenna comprises an antenna array.

10. The electronic device of claim 9, further comprising a wireless communication circuit disposed to the second PCB.

11. The electronic device of claim 10,
wherein the wireless communication circuit disposed to the first PCB comprises an Intermediate Frequency Integrated Circuit (IFIC), and
wherein the wireless communication circuit disposed to the second PCB comprises a Radio Frequency Integrated Circuit (RFIC).

12. The electronic device of claim 11,
wherein the wireless communication circuit disposed to the first PCB transmits and/or receives a frequency signal between 5 GHz and 15 GHz, and
wherein the wireless communication circuit disposed to the second PCB transmits and/or receives a frequency signal between 24 GHz and 100 GHz.

13. The electronic device of claim 11,
wherein the wireless communication circuit disposed to the second PCB comprises:
a first electric path to be electrically coupled with a first point on a first antenna element of the antenna array, and
a second electric path to be electrically coupled with a second point on a second element of the antenna array, and
wherein the wireless communication circuit provides a phase difference between a first signal at the first point and a second signal at the second point.

14. The electronic device of claim 1,
wherein the at least one capacitor comprises a variable capacitor, and
wherein the instructions cause the processor to control the variable capacitor, based on the frequency signal.

15. An electronic device comprising:
a printed circuit board (PCB), wherein the PCB comprises
a wireless communication circuit,
a first connector which comprises a first terminal and a second terminal,
a first conductive path which couples the wireless communication circuit and the first terminal,
a second conductive path which couples a ground and the second terminal,
a third conductive path which couples a direct current (DC) power source and the first conductive path, and at least one resistor and at least one first inductor coupled with the third conductive path,
a second connector which comprises a third terminal and a fourth terminal,
a fourth conductive path which couples the at least one antenna and the third terminal,
a fifth conductive path which couples the ground and the fourth terminal,
at least one capacitor coupled with the fifth conductive path, and
a sixth conductive path which couples the ground and the fourth conductive path, and
at least one second inductor coupled with the sixth conductive path;
a conductive member which comprises a third connector capable of electrically coupling with the first connector and a fourth connector capable of electrically coupling with the second connector, and transfers a frequency signal between the wireless communication circuit and the at least one antenna;
a processor electrically coupled with the PCB; and
a memory operatively coupled with the processor,
wherein the memory stores instructions, when executed, causing the processor to couple with the third conductive path and detect, on the basis of a DC voltage input to the processor, a connecting issue between the first connector and the third connector or a connecting issue between the second connector and the fourth connector.

* * * * *